W. F. FINNEY.
SEED-PLANTER.

No. 182,571. Patented Sept. 26, 1876.

WITNESSES:
E. Wolff
John Goethals

INVENTOR:
W. F. Finney
BY
ATTORNEYS.

UNITED STATES PATENT OFFICE.

WILLIAM F. FINNEY, OF EAST CASTLE ROCK, MINNESOTA.

IMPROVEMENT IN SEED-PLANTERS.

Specification forming part of Letters Patent No. 182,571, dated September 26, 1876; application filed July 15, 1876.

*To all whom it may concern:*

Figure 1:
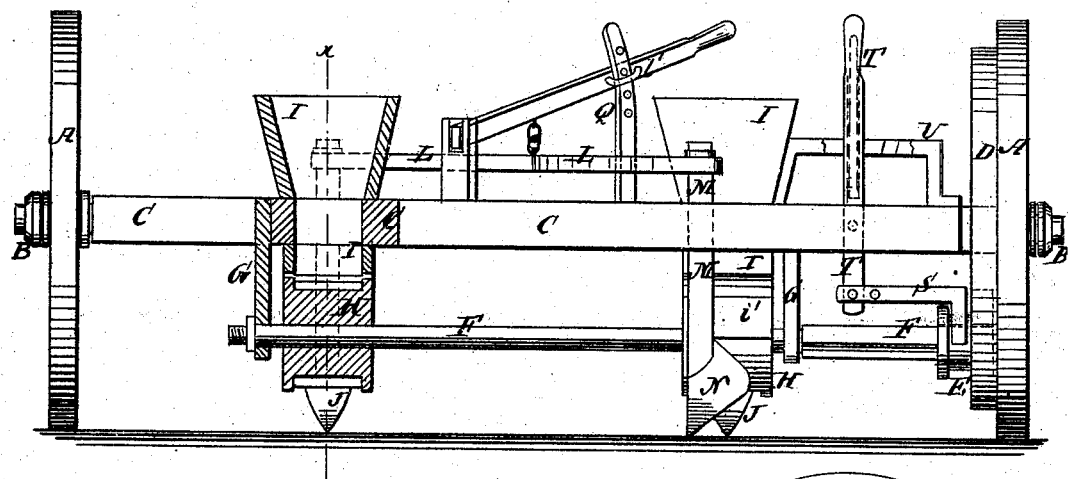
Figure 2:
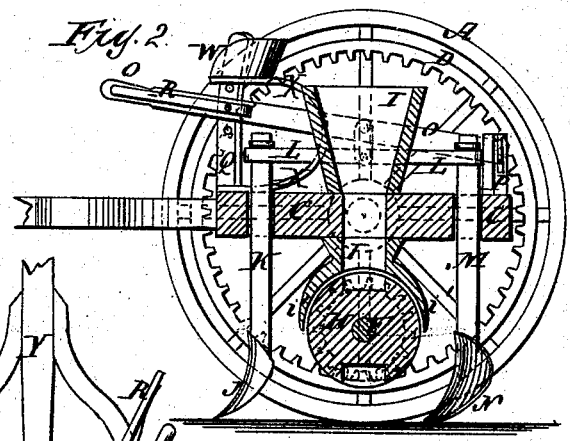
Figure 3:
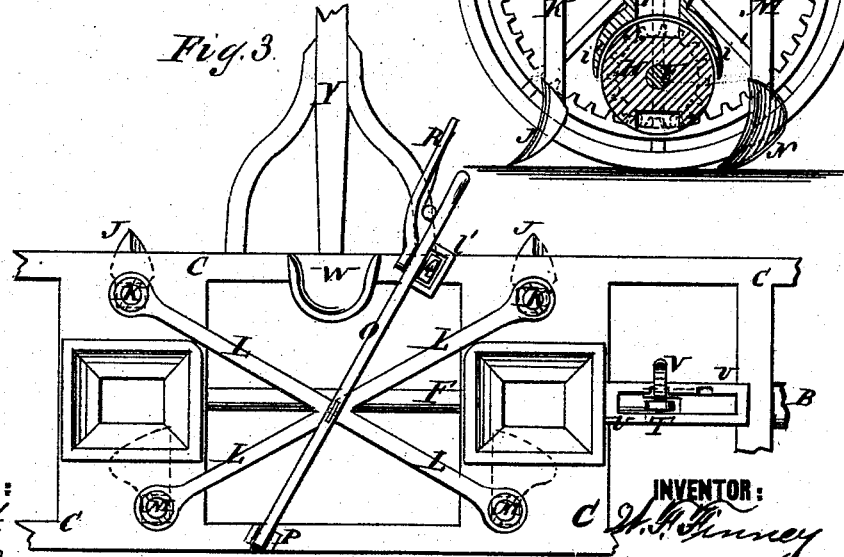

Be it known that I, WILLIAM FRANCIS FINNEY, of East Castle Rock, in the county of Dakota and State of Minnesota, have invented a new and useful Improvement in Seed-Planter, of which the following is a specification:

Figure 1 is a rear view of my improved planter, partly in section, to show the construction. Fig. 2 is a detail section of the same, taken through the line $x\ x$, Fig. 1. Fig. 3 is a top view of a part of the same.

Similar letters of reference indicate corresponding parts.

The object of this invention is to furnish an improved machine for planting corn, beans, sorghum, broom-corn, and other seeds, which shall be so constructed that it may be readily arranged to plant the seeds at any desired depth, which will enable the plows to be easily raised from the ground, and will enable the operating mechanism to be readily thrown into and out of gear with the driving-wheel.

The invention consists in the construction and combination of parts, which will be hereinafter more fully described, and then pointed out in the claims.

A are the wheels, which revolve upon the journals of the axles B, attached to the frame C. To one of the wheels A is attached a large internally-toothed gear-wheel, D, into the teeth of which mesh the teeth of the small gear-wheel E. The wheel E is placed upon the square end of the shaft F, so that it may carry the said shaft F with it in its revolution, and at the same time may be slid longitudinally upon said shaft to throw it into and out of gear with the gear-wheel E. The shaft F revolves in hangers G, attached to the frame C, and upon it are keyed the dropping-cylinders H, in the opposite sides of which are formed cups or recesses of such a size as to contain enough seed for a hill. For planting corn one of these cups is plugged up. For planting beans, they are both open. For planting sorghum and broom-corn, the dropping-cylinders H are removed and replaced with others having three cups, to receive and drop the seed. The cylinders H revolve in the lower parts of the seed-hoppers I, and form the bottoms of said seed-hoppers. The lower parts $i'$ of the front and rear sides of the seed-hoppers I project downward, and are curved to fit upon the front and rear sides of the cylinders H, to serve as guards to keep the seeds from falling out before they have been carried around to the lower parts of said cylinders.

If desired, the seeds may be further guarded from scattering by short conductor-spouts, extending nearly to the ground, and connected with the hoppers, or other suitable supports. The seed-hoppers I are attached to the frame C.

The furrows are opened to receive the seed by the plows J, which are attached to the lower ends of the standards K. The standards K pass up through sockets in the frame C, and their upper ends are attached to the forward ends of the bars L, which cross each other diagonally, and their rear ends are attached to the upper ends of the standards M. The standards M pass through sockets in the frame C, and to their lower ends are attached the covering-plows N. O is a lever, the rear end of which is pivoted to a stud, P, attached to the rear bar of the frame C. The lever O is connected with the bars L at their point of intersection, and to the side of its forward part is attached a keeper, $l'$, to receive the standard Q. The lower end of the standard Q is attached to the front bar of the frame C in such a position that the lever O may be conveniently reached and operated by the driver from his seat. In the standard Q are formed a number of holes, to receive the pin of the lever-catch R, which is pivoted to the lever O, and its pin passes through the said lever O and the said standard Q, to lock the plows in any position into which they may be adjusted. S is a bar, upon one end of which is attached a fork, to ride in a ring-groove upon the inner part of the hub of the gear-wheel E. The inner end of the bar S is pivoted to the lower end of the lever T, which is pivoted to the frame C, and its upper end passes up through a slotted bar, U, the ends of which are bent downward, and are attached to the frame C. The bar U has two notches formed in it, to receive the lever T, or a spring-catch, V, attached to said lever T. W is the driver's seat, the spring-support X of which is attached to the frame C in such a position that the driver from said seat can easily reach and operate the levers O and T to raise and lower the plows, and to throw the dropping mechanism into and out of gear with the driving-wheel A. Y is the tongue by which the machine is drawn and guided, and which is attached to the forward part of the frame C.

The driving-gearing should be incased, to prevent it from becoming clogged with soil.

Having thus described my invention, I claim as new and desire to secure by Letters Patent—

1. The combination of the diagonal bars L and the lever O with the standards K M of the opening and covering plows J N, and with the frame C, substantially as herein shown and described.

2. The combination of the fixed revolving shaft F, carrying the dropping-wheels H, with the frame C, hangers G, sliding pinion E, forked bar S, lever T, traction-wheel A, and spur-wheel D, all constructed and relatively arranged as herein set forth.

WILLIAM FRANCIS FINNEY.

Witnesses:
JAMES FINNEY,
FRANKLIN CHURCH.